Patented Feb. 21, 1950

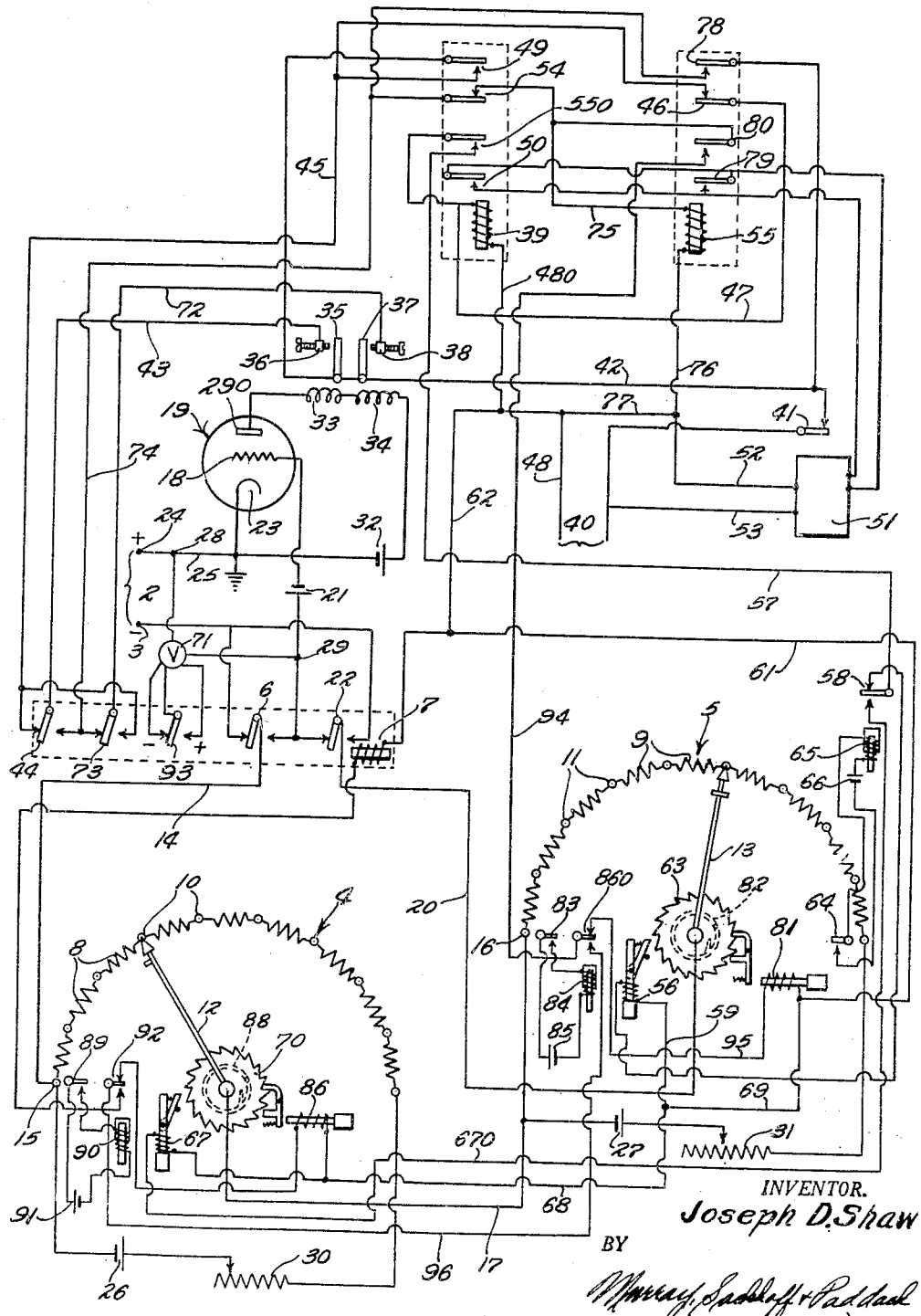

2,497,961

UNITED STATES PATENT OFFICE 2,497,961

ELECTRICAL MEASURING DEVICE

Joseph D. Shaw, Cincinnati, Ohio

Application January 17, 1946, Serial No. 641,696

4 Claims. (Cl. 171—95)

The present invention relates to electrical measuring devices and is particularly directed to a means for increasing the accuracy of devices for indicating or measuring voltages.

It is an object of this invention to provide a device for materially increasing the range of conventional voltmeters and also to improve the net accuracy of voltage indicators by automatically balancing out by known opposition voltages a sufficient portion of the unknown voltage so that the remaining unbalanced portion of the unknown voltage is within the range of such conventional meters.

Another object of the invention is to provide a completely automatic and accurate device for measuring the value of unknown voltages.

A further object of the invention is to provide a voltage measuring device which automatically and successively introduces into the opposition circuit of the unknown voltage a number of resistors having equal, predetermined impedance values, until the opposition circuit is in a substantially balanced condition.

A still further object of the invention is to provide in a voltage measuring device having the foregoing characteristics, an automatic means for adjusting the device in accordance with the polarity of the unknown voltage which applies in opposition to the unknown, polarized voltage a known voltage of opposite polarity.

Other objects will be apparent from the following specification and drawing wherein the figure is a wiring diagram of my electrical measuring device, the mechanical parts being shown in front elevation.

In the drawing the reference numeral 2 indicates a source of unknown voltage which may have a high internal resistance. The negative conductor 3 of this voltage source is normally connected in series with a pair of stepping relays 4 and 5 through a double throw, single pole switch 6 comprising one of a series of similar switches actuated simultaneously by an armature 7 of a polarity reversing relay. The stepping relays 4 and 5 have a number of resistors 8 and 9 respectively which are arranged in series and have interposed between them a circular row of taps 10 and 11 respectively. Movable switch arms 12 and 13 are rotatably mounted concentric with the rows of taps 10 and 11 respectively, and are automatically actuated by certain relays to consecutively include or exclude resistors from an opposition circuit to the unknown voltage 2.

The opposition circuit comprises the negative terminal 3 which is connected in series with the stepping relays 4 and 5 by means of a line 14 having the switch 6 interposed therein. This line is connected to the zero tap 15 of the row 10, and the circuit may pass through switch arm 12 or through one or more of the resistors 8 and thence to the switch arm 12 of the stepping relay 4, depending upon the setting of said arm. The switch arm 12 is connected to the zero tap 16 of the row 11 for stepping relay 5 by a line 17, the switch arm 13 of the latter relay being connected to the grid 18 of a thermionic tube 19 by a line 20 which has interposed therein a battery 21 and a double throw, single pole switch 22 actuated by armature 7. The cathode 23 of the tube is connected to the positive terminal 24 of the unknown voltage source by an electrical connection with line 25.

Batteries 26 and 27 supply current to the series of resistors 8 and 9 respectively, the negative terminals of said batteries being connected to zero taps 15 and 16 respectively so that the voltages across 8 and 9 are placed in opposition to the unknown voltage source and create an opposition circuit therefor. It will therefore be noted that a potential difference will exist between electrical points 28 and 29 in lines 25 and 20 respectively when the total voltage occurring between point 15 and switch arm 12 plus the voltage occurring between point 16 and switch arm 13 does not balance out the unknown voltage 2.

The potential across the resistors 8 and that across the resistors 9 may be accurately adjusted to a definite value by means of rheostats 30 and 31 placed in series in the circuits of batteries 26 and 27 respectively.

It is contemplated that the potential difference across each of the resistors 8 may be the equivalent of one volt and that the potential difference across each resistor 9 may be equal to one-tenth volt, thereby giving the entire row of resistors 9 the total potential difference of nine-tenths volts.

When the unknown voltage 2 becomes greater than the balancing voltages of stepping relays 4 and 5, grid 18 of tube 19 becomes sufficiently more negative than normal bias with respect to its cathode 23 and causes the current to decrease in the plate circuit comprising battery 32, polarized relay coils 33 and 34, and thermionic tube plate 29a. When this current is of a sufficiently low value a normally closed switch 35 of relay 33 is closed. Relay 33 is adjusted so that switch 35 closes when the potential of point 29 is more negative than that of point 28 by an amount somewhat greater than the potential difference occurring across one of the resistors 9.

As has been stated above relay switch 35 is adapted to close and engage contact 36 when the voltage across the unknown source 2 is greater than the voltage across the points 28 and 29 by an amount specified above, and the point 29 is negative with respect to the positive terminal 24. This switch action causes operation of the stepping relay mechanisms to automatically include in the opposition circuit a greater number of resistors and hence a greater countervoltage until the required part of the unknown voltage is balanced out thereby. However, in the event point 29 is more positive than the positive terminal 24, the plate circuit of the tube 19 will cause the normally opened relay 34 to move switch arm 37 into engagement with contact 38 and cause the stepping relay mechanisms to exclude successive resistors from the opposition circuit.

In the first instance when the switch arm 35 engages the contact 36, a circuit to relay 39 is closed, said circuit comprising a source of power 40, master switch 41, line 42, switch 35, contact 36, line 43, switch 44, line 45, switch 46, line 47, relay 39, and power lines 480 and 48. Actuation of the relay 39 closes lock switch 49 and also switch 50 which institutes actuation of the timer 51, said timer receiving power from source 40 by lines 52 and 53. Actuation of relay 39 also opens switch 54 thus preventing actuation of relay 55 until the cycle initiated by the actuation of relay 39 is completed. Master switch 41 is normally closed and upon actuation of the timer 51 said switch remains closed until it is opened by said timer after a period of time. Said timer then holds said switch open for a period of time and then returns said switch to normally closed position. When master switch 41 is opened by the timer 51, relay 39 is no longer actuated and lock switch 49 opens. After switch 41 is again closed by the timer, relay 39 does not close unless switch 35 engages contact 36.

Now, assuming that the stepping relays are in zero positions, it will be noted that actuation of the relay 39 also closes switch 550 which connects power source 40 through switch 46 and switch 41 to a solenoid 56 by line 57 which has also in series therewith a double throw, single pole switch 58. The opposite side of the solenoid 56 is connected to the source of power 40 by lines 59, 69, 61, 62 and 48. Upon actuation of the solenoid 56 movement of the armature therefor advances a ratchet wheel 63 of the stepping relay 5 one notch and the associated arm 13 is advanced to the next succeeding tap 11 thereby bringing into the opposition circuit an additional resistor 9. After a predetermined interval of time the timer 51 opens master switch 41 thereby de-energizing solenoid 56 and allowing its armature to return to neutral position (shown in the drawing) for engagement with the next succeeding notch on the wheel 63 upon the reception of the next electric impulse from the power source 40. The foregoing cycle is repeated until either sufficient balance obtains between the unknown voltage source 2 and the opposition circuit (i. e. arm 35 no longer engages contact 36) or until the arm 13 advances clockwise to a point where an arm of switch 64 is urged into engagement with the lower contact, whereupon a relay 65 is powered by battery 66. This brings switch 58, which normally engages the upper contact, into engagement with the lower contact thus connecting solenoid 67 through line 670 to line 57. The opposite side of solenoid 67 is connected to power source 40 by lines 68, 69, 61, 62, and 48. Relay 65 is of the time delay type so that arm 58 does not engage the lower contact after the initial actuation of relay 65 until master switch 41 has been opened by the timer 51. The solenoid 67 continues to advance ratchet wheel 70 in the same manner that solenoid 56 advanced ratchet wheel 63 until the circuit is balanced sufficiently that arm 35 no longer engages contact 36. The total reading of the stepping relays 4 and 5 plus the unbalanced fraction in the circuit indicated on a volt meter 71 gives the accurate voltage of the unknown source 2. It is contemplated that the range of voltmeter 71 should be greater than the sum of the minimum numerical value of the potential difference that must occur between points 28 and 29 in order that arm 35 contacts 36 plus the minimum numerical value of the potential difference that must occur between 28 and 29 in order that 37 contacts 38.

In the event the point 29 is more positive than the positive terminal 24 and therefore if the circuit is in a sufficiently unbalanced condition, the arm of normally open relay 37 will engage contact 38 which closes the relay 55. To this end the source of power 40 is connected through master switch 41 to line 42, switch arm 37, contact 38, line 72, switch 73, line 74, switch 54, line 75, relay 55, line 76, line 77 and line 48. In addition actuation of relay 55 opens switch 46 thus preventing actuation of relay 39 until the cycle initiated by the actuation of relay 55 is completed.

Upon actuation of the relay 55, the locking switch 78 and the timer switch 79 are closed. Timer switch 79 thus initiates operation of the timer 51. This action also closes switch 80, which connects solenoid 81 to power source 40 through switches 41, 78, 54, 80, line 94, switch 860, and line 95. The opposite side is connected to power source 40 through lines 61, 62, and 48. This permits the ratchet wheel 63 to move counterclockwise one notch under the bias of a coil spring 82. This process continues until the circuit is substantially balanced (i. e. until arm 37 no longer engages contact 38) or until the arm 13 engages normally open switch arm 83. The closing of switch 83 actuates relay 84 by power supplied by battery 85. Relay 84 is a time delay relay with a period of delay such that it brings switch 860 into engagement with its lower contact after timer 51 has opened switch 41. A solenoid 86 is connected to the power source 40 by switch 92, line 96, switch 860, line 94, switches 80, 54, 78, and 41. The opposite side of solenoid 86 connects to power source 40 by lines 68, 69, 61, 62, and 48. In the event substantial balance has not been attained in the opposition circuit, solenoid 86 of stepping relay 4 is brought into operation which actuates the ratchet wheel 70 to move the arm 12 counterclockwise under the action of a coil spring 88 in the same manner that solenoid 81 permitted 13 to move counterclockwise and until the circuit is substantially balanced, or until the arm 12 closes switch 89. This causes a relay 90 to be actuated by power supplied by battery 91. Relay 90 is of the time delay type with a period such that it moves a switch 92 into engagement with its lower contact after timer 51 has opened switch 41.

If arm 37 is in engagement with contact 38 after arm 12 has moved to point 15 and switch 92 is in contact with its lower contact, relay 7 receives an impulse of current from power source 40 through switch 92, line 96, switch 860, line 94, switches 80, 34, 78, and 41. The opposite side of relay 7 connects to power source 40 by lines 62 and 48. Relay 7 is an impulse type relay which changes the positions of switches 22, 6, 93, 73 and 44 whenever it receives an impulse. Thus when actuated as described it causes said switches to engage their right hand contacts and the device is prepared to measure unknown voltages of polarity opposite to that shown in the drawing. It will be noted that in said reversed switch positions the switches 35 and 37 now control relays 55 and 39 respectively. This circuit allows opposition voltages, produced by stepping relays 4 and 5, to be placed in the opposite direction to that previously described. Switch 93 conditions voltmeter 71 to measure voltages of opposite polarity to that previously described. In the event that the unknown voltage returns to the polarity indicated above, switches 22, 6, 93, 73, and 44 will return to the positions shown in the drawing and the device will again be prepared to measure voltages of the polarity shown.

It will therefore be understood that switches 44, 73, 93, 6 and 22 and the armature 7 which actuates said switches in unison when the armature is energized serve to reverse the polarity of the opposition circuit when such reversal is necessary to balance the unknown voltage. For this reason I have used the terms "polarity reversing relay" to designate these armature controlled switches in the claims.

What is claimed is:

1. An electric measuring device comprising a source of unknown voltage, a stepping relay having a number of resistors of predetermined and uniform values connected in series, a tap connected to the end of each resistor, and including a zero tap, said zero tap being connected to one terminal of the unknown voltage, a movable switch arm adapted to successively engage the taps, a source of known voltage connected across the series of resistors to constitute the known voltages applied by the stepping relay and opposition circuit to the unknown voltage, actuating means for the arm, relay means interposed in the opposition circuit between the switch arm and the remaining terminal of the unknown voltage and responsive to an unbalance in said circuit, means connecting the relay means with the arms actuating means to change the value of potential difference applied by the stepping relay, a polarity reversing relay in the opposition circuit, and means actuated by the zero tap contacting position of the stepping relay arm for operating the polarity reversing relay.

2. An electric measuring device comprising a source of unknown voltage, a stepping relay having a number of resistors of predetermined and uniform values connected in series, a series of taps each connected to adjacent ends of the resistors, said series including a zero tap connected to one terminal of the unknown voltage, a movable switch arm adapted to successively engage the taps, an opposition circuit to the unknown voltage including a battery connected across the series of resistors, advancing and retracting mechanism for the arm, a pair of polarized relays connected in the opposition circuit and responsive to an unbalance in said circuit, means connecting the polarized relays with the advancing and retracting mechanism to respectively cut in or out of the opposition circuit one or more of the said resistors until substantial balance is attained between the unknown voltage and the voltage in the opposition circuit, a polarity reversing relay in the opposition circuit, a meter connected across the terminals of the unknown voltage and actuated by the polarity reversing relay, and means actuated by the zero tap contacting position of the stepping relay arm for operating the polarity reversing relay.

3. An electric measuring device comprising a source of unknown voltage, a stepping relay having a number of resistors of predetermined and uniform values connected in series, a tap connected to the ends of each resistor including a zero tap at one end of the series connected to one terminal of the unknown voltage, a movable switch arm adapted to successively engage the taps, a source of known voltage connected across the series of resistors to constitute the known voltages applied by the stepping relay and opposition circuit to the unknown voltage, advancing and retracting mechanism for the arm, a pair of polarized relays responsive to an unbalance in said circuit, means connecting the polarized relays with the mechanism to change the value of potential difference applied by the stepping relay to substantially balance the unknown voltage in the opposition circuit, a polarity reversing relay in the opposition circuit, and means actuated by the zero tap contacting position of the stepping relay arm for operating the polarity reversing relay.

4. An electric measuring device comprising a source of unknown voltage, a stepping relay having a number of resistors of predetermined and uniform values connected in series, a tap connected to the end of each resistor, and including a zero tap, said zero tap being connected to one terminal of the unknown voltage, a movable switch arm adapted to successively engage the taps, a source of known voltage connected across the series of resistors to constitute the known voltages applied by the stepping relay and opposition circuit to the unknown voltage, actuating means for the arm, relay means interposed in the opposition circuit between the switch arm and the remaining terminal of the unknown voltage and responsive to an unbalance in said circuit, a potential indicating device connected between the movable switch arm and the said remaining terminal of the unknown voltage, means connecting the relay means with the arm actuating means to change the value of potential difference applied by the stepping relay, a polarity reversing relay in the opposition circuit, means actuated by the zero tap contacting position of the stepping relay arm for operating the polarity reversing relay, and means actuated by the polarity reversing relay for interchanging the terminal connections of the potential indicating device.

JOSEPH D. SHAW.

REFERENCES CITED

The following references are of record in the file of this patent:

UNITED STATES PATENTS

| Number | Name | Date |
|---|---|---|
| 1,178,772 | Zimmerman | Apr. 11, 1916 |
| 1,438,947 | Conway | Dec. 19, 1922 |
| 1,696,415 | Roberts | Dec. 25, 1928 |
| 2,046,422 | Matte | July 7, 1936 |
| 2,062,915 | Lamb | Dec. 1, 1936 |
| 2,279,232 | Graham | Apr. 7, 1942 |
| 2,321,605 | Keinath | June 15, 1943 |
| 2,384,167 | Harrington et al. | Sept. 4, 1945 |

FOREIGN PATENTS

| Number | Country | Date |
|---|---|---|
| 266,798 | Great Britain | Feb. 28, 1927 |

Certificate of Correction

Patent No. 2,497,961 February 21, 1950

JOSEPH D. SHAW

It is hereby certified that errors appear in the printed specification of the above numbered patent requiring correction as follows;:

Column 5, line 41, and column 6, lines 15 and 38, for the words "relay and" read *relay an*; column 5, line 48, for "arms" read *arm*; column 6, line 25, for "contactng" read *contacting*;

and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*